United States Patent [19]

Cully et al.

[11] Patent Number: 5,292,546

[45] Date of Patent: Mar. 8, 1994

[54] PROCESS FOR THE REMOVAL OF CHOLESTEROL FROM EGG YOLK

[75] Inventors: Jan Cully, Garching/Alz; Heinz-Rüdiger Vollbrecht, Altenmarkt, both of Fed. Rep. of Germany

[73] Assignee: SKW Trostberg Aktiengesellschaft, Trostberg, Fed. Rep. of Germany

[21] Appl. No.: 845,347

[22] Filed: Mar. 4, 1992

Related U.S. Application Data

[63] Continuation of Ser. No. 613,320, Nov. 15, 1990, abandoned.

[30] Foreign Application Priority Data

Apr. 26, 1990 [DE] Fed. Rep. of Germany ....... 4013367

[51] Int. Cl.$^5$ ............................................. A23L 1/015
[52] U.S. Cl. ................................... 426/614; 426/422; 426/425; 426/480
[58] Field of Search ............... 426/614, 425, 417, 491, 426/422, 424, 425, 429, 437, 442, 480; 260/420

[56] References Cited

U.S. PATENT DOCUMENTS

| | | |
|---|---|---|
| 3,491,132 | 1/1970 | Reiners et al. |
| 4,290,774 | 9/1981 | Girgis et al. .................. 23/230 B |
| 4,383,992 | 5/1983 | Lipari et al. |
| 4,675,202 | 6/1987 | Wenger et al. .................. 426/614 |
| 4,880,573 | 11/1989 | Courregelongue et al. ......... 260/420 |
| 5,063,077 | 11/1991 | Vollbrecht et al. .............. 426/442 |
| 5,091,203 | 2/1992 | Conte, Jr. et al. .............. 426/480 |

FOREIGN PATENT DOCUMENTS

28449/89  7/1989  Austria.
318326   5/1989  European Pat. Off..

OTHER PUBLICATIONS

International Publication No. WO 91/11114, International Pub. Date Aug. 8, 1991-(International Appln. No. PCT/AU90/00489, International Filing Date Oct. 12, 1990).

R. W. Burley and H. W. Cook "Isolation and Composition of Avian Egg Yolk Granules and Their Constituent-And-Lipovitellins", Can. J. Biochem. Physiol. vol. 39 (1961) pp. 1295-1307.

D. V. Vadehra, Joan M. Bain and R. W. Burley, "Lipid-Protein Globules of Avian Egg Yolk, Isolation and Properties of Glubules Stable in Concentrated Sodium Chloride Solution", Biochem. J. (1977) 166, 619-624.

R. W. Burley "Studies on the Apoproteins of the Major Lipoprotein of the Yolk of Hen's Eggs, III. Influence of Salt Concentration During Isolation on the Amount and Composition of the Apoproteins", Aust. J. Biol. Sci. 1978 31, 587-92.

*Primary Examiner*—Donald E. Gzaja
*Assistant Examiner*—Anthony Weier
*Attorney, Agent, or Firm*—Felfe & Lynch

[57] ABSTRACT

The present invention provides a process for the removal of cholesterol from egg yolk, wherein 1. a diluted egg yolk mixture is produced by the addition of an aqueous solution of ammonium carbonate or of sodium chloride,
2. the diluted egg yolk mixture is mixed with a solid adsorbent or complexing agent until the cholesterol is adsorbed or complexed and thereafter
3. the solid adsorbent loaded with cholesterol or the cholesterol complex is separated from the egg yolk mixture and
4. subsequently ammonium carbonate or sodium chloride and possibly water is removed.

33 Claims, No Drawings

PROCESS FOR THE REMOVAL OF CHOLESTEROL FROM EGG YOLK

FIELD OF THE INVENTION

This application is a continuation, of application Ser. No. 07/613,320, filed Nov. 15, 1990, now abandoned.

The present invention is concerned with a multi-step process for the removal of cholesterol from egg yolk.

BACKGROUND OF THE INVENTION

Cholesterol and cholesterol esters, both of which are designated in the following as cholesterol, are lipophilic substances which occur in numerous important foodstuffs of animal origin, for example egg yolk, meat, animal fats and the like.

As is known, increased cholesterol levels in the blood serum of humans represent an increased risk factor for arteriosclerosis and for coronary heart disease.

By means of a reduction of the cholesterol intake, it is, in most pathological cases, possible again to achieve the normal cholesterol levels in blood serum. For this reason, an important endeavour of the foodstuff industry is to carry out a marked reduction of the cholesterol in fat-rich foodstuffs of animal origin.

An important problem is thereby the substantial maintenance of the sensory and nutritional-physiological properties of the foodstuffs.

According to the prior art, admittedly a number of processes are known for the isolation of cholesterol but, because of the chemical change of important components of the starting material, for example of proteins, triglycerides and the like, these methods are not suitable for the reduction of the cholesterol content of foodstuffs.

A relatively gentle process which has only become known recently uses carbon dioxide high pressure extraction for the removal of cholesterol (cf. V. Krukonis, Supercritical Fluid processing, International Symposium on Supercritical Fluids, Nice, 1988).

This process is admittedly characterised by the physiological harmlessness of the extraction agent, carbon dioxide, but working at a high pressure is technically somewhat laborious. Furthermore, according to this process, cholesterol cannot be removed selectively under gentle conditions because triglycerides are also extracted at the same time. An improvement of the selectivity by increasing the temperature is admittedly possible in principle but this has a negative effect on the loading of the carbon dioxide with cholesterol and on the quality of the product obtained.

Another known process for the removal of cholesterol derivatives is the complexing of these substances with $\beta$-cyclodextrin. Thus, for example, according to published European Patent Specification No. 0,326,469, egg yolk powder, after homogenization thereof with water, is stirred for 5 hours at 40° C. with $\beta$-cyclodextrin and the complex obtained is separated by centrifuging. In this way, however, the cholesterol contents can only be reduced to at most 74% of the initial values.

According to the process described in copending U.S. application Ser. No. 439,556, filed Nov. 21, 1989, exclusively, the egg yolk plasma, which has been obtained from egg yolk with the help of an emulsion-breaking agent (water) after centrifuging off the LDL granula fraction, is mixed with $\beta$-cyclodextrin. Subsequently, after separating the $\beta$-cyclodextrin, the egg yolk plasma treated in this manner is again combined with the LDL granula fraction. However, in some cases, the separation of the egg yolk plasma from the LDL granula fraction and from the $\beta$-cyclodextrin-cholesterol complex gives rise to difficulties.

OBJECT OF THE INVENTION

Therefore, it is an object of the present invention to provide a process for the removal of cholesterol from egg yolk which does not suffer from the above-mentioned disadvantages of the prior art and which makes possible a substantially selective reduction of these materials with a low technical expenditure and under gentle conditions.

DESCRIPTION OF THE INVENTION

Thus, according to the present invention, there is provided a process for the removal of cholesterol from egg yolk, wherein 1. a diluted egg yolk mixture is produced by the addition of an aqueous solution of ammonium carbonate or of sodium chloride,
2. the diluted egg yolk mixture is mixed with a solid adsorbent or complexing agent until the cholesterol is adsorbed or complexed and thereafter
3. the solid adsorbent loaded with cholesterol or the cholesterol complex is separated from the egg yolk and
4. subsequently the ammonium carbonate or sodium chloride and possibly water is removed.

Surprisingly, we have found that, according to the process of the present invention, egg yolk products are obtained with a low total cholesterol content and with good sensory properties.

In the scope of the present invention, with the term "cholesterol" are designated not only cholesterol per se but also cholesterol esters.

In the case of the process according to the present invention, in the first step a diluted egg yolk mixture is produced by the addition of an aqueous solution of ammonium carbonate or of sodium chloride in which, by the addition of ammonium carbonate or sodium chloride, a breaking of the emulsion and the formation of an LDL granula fraction is prevented. The amount of ammonium carbonate solution can be varied within wide limits. It has proved to be especially advantageous so to choose the addition of ammonium carbonate that it is present in a concentration of 0.5 to 2.5% by weight, referred to the total weight of the diluted egg yolk mixture. The ammonium carbonate solution can be produced before the addition to the egg yolk or can be produced in situ by the separate addition of water and ammonium carbonate.

Referred to the initial weight of the egg yolk, the ammonium carbonate should preferably be added in an amount of from 0.3 to 20% by weight and especially preferably of from 1 to 5% by weight.

In the scope of the present invention, the term ammonium carbonate includes ammonium carbonate per se ($(NH_4)_2CO_3$), as well as ammonium bicarbonate ($NH_4HCO_3$).

If, in the first step of the process according to the present invention, an aqueous solution of sodium chloride is added, then, in principle, what was stated above with regard to the ammonium carbonate solution applies in the same way. With the sodium chloride solution, preferably so much sodium chloride is added that there is obtained a sodium chloride concentration of from 2 to 10% by weight, referred to the total weight of the diluted egg yolk mixture. A sodium chloride concentration of from 4 to 6% by weight is especially preferred.

The addition of water in the scope of the dilution of the egg yolk with the aqueous solution is preferably to amount to from 10 to 200% by weight and especially preferably to from 50 to 100% by weight, referred to the initial weight of the egg yolk.

In the second step of the process according to the present invention, there then takes place the removal of the cholesterol from the egg yolk mixture by adsorption on an appropriate solid material or by complexing with the help of an appropriate complexing agent.

As adsorption agent, there can be used the conventional non-polar materials, for example activated carbon, reverse phase silica gel and the like.

The use of complexing agents, for example $\beta$-cyclodextrin, which makes possible an especially selective separation of the cholesterol, has proved to be especially advantageous.

The amount of adsorption agent or of complexing agent can be varied within wide limits but there is preferably used 3 to 40% by weight of adsorbent or complexing agent referred to the dry weight of the egg yolk.

In the case of this loading of the adsorbent or of the complexing, which can take place according to known methods, for example by simple mixing or stirring, depending upon the nature and amount of adsorbent or complexing agent used, about 80 to 95% of the cholesterol is removed, whereas the other components of the egg yolk remain substantially in the liquid phase.

The second step can be carried out at ambient temperature but it is preferable to work at a temperature lowered to 0° to 10° C.

In the third step of the process according to the present invention, the adsorbent loaded with cholesterol or the cholesterol complex is separated from the liquid egg yolk mixture, in which case there can be employed the technically usual processes and methods for the separation of solids and liquids. Because of the rapid and complete separation, according to the present invention, centrifuging is preferred. However, other separation processes, for example filtration, can also be used.

In general, after recovery thereof, the adsorbent or complexing agent can be used again.

The egg yolk mixture freed from cholesterol in the third step of the process according to the present invention can be further worked up directly to give egg yolk products. However, for reasons of quality of taste, it is recommended again to remove the ammonium carbonate or sodium chloride. Therefore, in the fourth step of the process according to the present invention, the sodium chloride and/or ammonium carbonate and possibly also water are again removed from the egg yolk.

In the case of ammonium carbonate, the removal can take place by heating to temperatures of from 40° to 90° C. and preferably of from 55° to 70° C., the heating preferably being carried out in a vacuum.

Sodium chloride is preferably removed by ultrafiltration and/or electrodialysis. If desired, the water can also be removed completely or partially at the same time or separately, for example by simple spray drying or vacuum evaporation. In this way, according to the degree of drying, there is obtained a liquid egg material or an egg yolk powder with a total cholesterol content reduced by about 80 to 95%. On the basis of this good reduction of the cholesterol content, together with the further advantages, such as low technical expense and good sensory quality of the egg yolk products obtained, the process according to the present invention is especially suitable for carrying out on a large scale.

The following Examples are given for the purpose of illustrating the present invention.

EXAMPLE 1

2 kg. of egg yolk with a total cholesterol content of 1.2% by weight were diluted with 2 kg. of distilled water. Thereafter, 50 g. of ammonium carbonate were added thereto.

Subsequently, the diluted egg yolk mixture was mixed with 280 g. of $\beta$-cyclodextrin and stirred for 30 minutes at 10° C. Thereafter, the loaded $\beta$-cyclodextrin was separated from the egg yolk mixture by centrifuging.

The diluted egg yolk mixture was finally subjected to a brief vacuum treatment at 50° C., the ammonium carbonate and the added water thereby being removed.

As product, there was obtained an egg yolk with a total cholesterol content of 0.18% by weight, which corresponds to an 85% reduction in comparison with the untreated egg yolk.

EXAMPLE 2

2 kg. of egg yolk with a total cholesterol content of 1.2% by weight were diluted with 1 kg. of distilled water and mixed with 75 g. of ammonium bicarbonate.

Thereafter, to the egg yolk mixture obtained was added 280 g. of $\beta$-cyclodextrin, followed by stirring for 60 minutes at 15° C. and subsequent centrifuging.

In this way, there was obtained a diluted egg yolk-ammonium carbonate mixture with a total cholesterol content of 0.14% by weight. This was freed from ammonium bicarbonate and water by spray drying at 75° C. and worked up to give an egg yolk powder with a total cholesterol content of 0.4% by weight, which corresponds to an 83% reduction of cholesterol in comparison with an untreated egg yolk powder.

EXAMPLE 3

2 kg. of egg yolk with a cholesterol content of 1.2% by weight were treated in such a manner that the egg yolk was mixed with 2 kg. of an aqueous 10% by weight solution of sodium chloride.

Subsequently, the egg yolk-salt mixture was mixed with 280 g. of $\beta$-cyclodextrin and stirred for 30 minutes at 5° C. Thereafter, the loaded $\beta$-cyclodextrin was separated from the egg yolk phase by centrifuging.

The diluted egg yolk phase was thereupon subjected to a cross-flow ultrafiltration, the moisture content thereby being adjusted to the initial value and the sodium chloride content about halved.

Finally, the sodium chloride content was reduced to a value of about 0.3% by means of an electrodialysis step.

As product, there was obtained an egg yolk with a total cholesterol content of 0.12% by weight, which corresponds to a 90% reduction in comparison with untreated egg yolk.

We claim:

1. A method for removing 80 to 95% by weight of the total weight of cholesterol contained in an egg yolk, said method comprising the sequential steps of:
    (a) adding water and ammonium carbonate or ammonium bicarbonate to the egg yolk to form an aqueous egg yolk mixture, said ammonium carbonate or ammonium bicarbonate being added in an amount insufficient to cause breaking of the egg yolk;

(b) admixing a solid adsorbent or a complexing agent with the aqueous egg yolk mixture whereby the cholesterol contained in said aqueous egg yolk mixture is adsorbed on the adsorbent or complexed with the complexing agent;

(c) separating the adsorbent loaded with the cholesterol or the cholesterol complexed with the complexing agent from the aqueous egg yolk mixture to obtain an aqueous egg yolk mixture of reduced cholesterol content; and (d) removing the ammonium carbonate or ammonium bicarbonate from the aqueous egg yolk mixture of reduced cholesterol content.

2. The method of claim 1 wherein, in step (a), said ammonium carbonate or ammonium bicarbonate and water are added to the egg yolk until the ammonium carbonate or ammonium bicarbonate concentration in the aqueous egg yolk mixture is 0.5% to 2.5% by weight based on the total weight of the aqueous egg yolk mixture.

3. The method of claim 1, wherein in step (a), said water and said ammonium carbonate or ammonium bicarbonate are added to the egg yolk until the concentration of ammonium carbonate or ammonium bicarbonate in the aqueous egg yolk mixture is 0.3% to 20% by weight based on the initial weight of the egg yolk.

4. The method of claim 3, wherein said water and ammonium carbonate or ammonium bicarbonate are added to the egg yolk until the concentration of ammonium carbonate or ammonium bicarbonate in the aqueous egg yolk mixture is 1% to 5% by weight based on the initial weight of the egg yolk.

5. The method of claim 1, wherein, in step (a), water is added to the egg yolk in an amount of 10% to 200% by weight based on the initial weight of the egg yolk.

6. The method of claim 5, wherein water is added to the egg yolk in an amount of 50% to 100% by weight based on the initial weight of the egg yolk.

7. The method of claim 1, wherein, in step (b), the complexing agent is $\beta$-cyclodextrin.

8. The method of claim 1, wherein the amount of adsorbent or complexing agent added in step (b) is 3% to 40% by weight based on the dry weight of the egg yolk.

9. The method of claim 1, wherein step (b) is carried out at a temperature of 0° to 10° C.

10. The method of claim 1, wherein, in step (c), the adsorbent loaded with cholesterol or the complex of cholesterol with the complexing agent is removed from the aqueous egg yolk mixture by centrifuging.

11. The method of claim 1, wherein, in step (d), the ammonium carbonate or ammonium bicarbonate is removed from the aqueous egg yolk mixture of reduced cholesterol content by heating the egg yolk mixture of reduced cholesterol content to a temperature of 40° to 90° C.

12. The method of claim 11, wherein the aqueous egg yolk mixture of reduced cholesterol content is heated to a temperature of 55° to 70° C.

13. The method of claim 11, wherein the aqueous egg yolk mixture of reduced cholesterol content is heated in a vacuum.

14. The method of claim 1, wherein step (d) further comprises removing the water from the aqueous egg yolk mixture of reduced cholesterol content.

15. The method of claim 14 wherein, in step (d), the ammonium carbonate and water are removed from the aqueous egg yolk mixture of reduced cholesterol content by heating the egg yolk mixture to a temperature of 40° to 90° C.

16. The method of claim 15 wherein, in step (d), the ammonium carbonate and water are removed from the aqueous egg yolk mixture of reduced cholesterol content by heating the egg yolk mixture to a temperature of 55°-70° C.

17. The method of claim 9 wherein said step (b) is carried out from 30 minutes to 120 minutes.

18. The method of claim 17 wherein said step (b) is carried out for 60 minutes.

19. The method of claim 17 wherein said step (b) is carried out for 30 minutes.

20. A method for removing 80 to 95% by weight of the total weight of cholesterol contained in an egg yolk, said method comprising the sequential steps of:

(a) adding water and sodium chloride to the egg yolk to form an aqueous egg yolk mixture, said sodium chloride being added in an amount insufficient to cause breaking of the egg yolk;

(b) admixing a solid adsorbent or a complexing agent with the aqueous egg yolk mixture whereby the cholesterol contained in said aqueous egg yolk mixture is adsorbed on the adsorbent or complexed with the complexing agent;

(c) separating the adsorbent loaded with the cholesterol or the cholesterol complexed with the complexing agent from the aqueous egg yolk mixture to obtain an aqueous egg yolk mixture of reduced cholesterol content; and (d) removing the sodium chloride from the aqueous egg yolk mixture.

21. The method of claim 20 wherein, in step (a), said aqueous sodium chloride solution is added to the egg yolk until the concentration of sodium chloride in the aqueous egg yolk mixture is 2% to 10% by weight based on the total weight of the aqueous egg yolk mixture.

22. The method of claim 21, wherein said aqueous sodium chloride solution is added to the egg yolk until the sodium chloride concentration in the aqueous egg yolk mixture is 4% to 6% by weight, based on the total weight of the aqueous egg yolk mixture.

23. The method of claim 20, wherein, in step (d), sodium chloride is removed by ultrafiltration, electrodialysis or both.

24. The method of claim 20, wherein, in step (a), water is added to the egg yolk in an amount of 10 to 200% by weight based on the initial weight of the egg yolk.

25. The method of claim 24, wherein water is added to the egg yolk in an amount of 50 to 100% by weight based on the initial weight of the egg yolk.

26. The method of claim 20, wherein, in step (b), the complexing agent is $\beta$-cyclodextrin.

27. The method of claim 20, wherein the amount of adsorbent or complexing agent added in step (b) is 3 to 40% by weight based on the dry weight of the egg yolk.

28. The method of claim 20, wherein, in step (c), the adsorbent loaded with cholesterol or the complex of cholesterol with the complexing agent is removed from the aqueous egg yolk mixture by centrifuging.

29. The method of claim 20, wherein step (b) is carried out at a temperature of 0° to 10° C.

30. The method of claim 29 wherein said step (b) is carried out from 30 minutes to 120 minutes.

31. The method of claim 30 wherein said step (b) is carried out for 60 minutes.

32. The method of claim 30 wherein said step (b) is carried out for 30 minutes.

33. The method of claim 20, wherein step (d) further comprises removing the water from the aqueous egg yolk mixture.

* * * * *